Patented May 22, 1934

1,959,474

UNITED STATES PATENT OFFICE 1,959,474

INDIGOID DYESTUFFS

Erwin Hoffa and Hans Heyna, Hoechst-on-the-Main, Germany, assignors to General Aniline Works, Inc., New York, N. Y., a corporation of Delaware No Drawing. Application March 30, 1928, Serial No. 266,102. In Germany April 4, 1927

3 Claims. (Cl. 260—49)

Our present invention relates to new vat dyestuffs.

Thioindigo dyestuffs which are substituted only in the 4.5- or in the 4'5'-position have hitherto scarcely been known.

This invention is based on the discovery that particularly the thioindigo dyestuffs containing in the oxythionaphthene nucleus two substituents, that is a methyl group in 4-position and a halogen atom in 5-position are remarkable for their excellent fastness to boiling and are in this respect not surpassed by any of the hitherto known thioindigo dyestuffs of the same shade and otherwise equal fastness properties.

The new dyestuffs contain the following group:

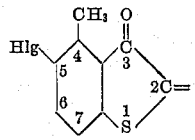

wherein Hlg stands for a halogen atom. The 4-methyl-5-halogenhydroxy-thionaphthenes, from which the new dyestuffs can be prepared, may be obtained by treating a compound of the following formula:

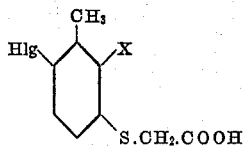

wherein Hlg stands for a halogen atom and X for CN, CONH₂, or COOH, with an agent capable of closing the ring. The new hydroxythionaphthenes can be transformed into the corresponding thioindigo dyestuffs by one of the usual methods. As we have furthermore found, the 4.4'-dimethyl-5.5'-dihalogen-thioindigo can be obtained from the 4.4'-dimethylthioindigo by treating it with a halogen.

Finally we have found that also the condensation products, obtainable according to one of the usual methods by means of the new hydroxythionaphthenes, exhibit fastness properties similar to those of the dyestuffs obtainable by oxidizing the said hydroxythionaphthenes.

The following examples illustrate our invention, but they are not intended to limit it thereto, the parts being by weight:

(1) 37 parts of 3-methyl-4-chlorophenyl-1-thioglycolic acid-2-nitrile are dissolved in 1250 parts of water, 20 parts of caustic soda solution and 5 parts of sodium sulfide. When the dissolution has taken place a further quantity of 180 parts of caustic soda solution is added and the whole is stirred for 2 hours at 80° C. to 85° C. The separation of the sodium salt of the 4-methyl-5-chloro-3-amino-1-thionaphthene-2-carboxylic acid begins already on heating the solution and is nearly complete after addition of 100 parts of sodium chloride. After filtering by suction and washing with a sodium chloride solution, the moist paste is dissolved in twenty times its weight of water with the addition of small quantities of caustic soda solution and bisulfite, the whole is filtered, the filtrate is acidified with dilute sulfuric acid and heated on the water bath until the formation of the hydroxythionaphthene is complete. After cooling, the hydroxythionaphthene is filtered by suction, washed and transformed into the dyestuff according to one of the known methods.

The 4.4'-dimethyl-5.5'-dichloro-bis-thionaphthene-indigo dissolves in sulfuric acid to a green solution. It dissolves when being vatted to a yellow solution and produces on cotton clear reddish-violet dyeings of extraordinarily good fastness properties. It has the following formula:

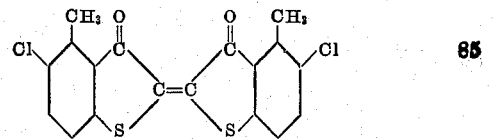

The 3-methyl-4-chlorophenyl-1-thioglycolic acid-2-nitrile can be prepared by exchanging in the 6-chloro-3-amino-2-cyano-1-methylbenzene the amino group for the group -S-CH₂-COOH according to one of the known methods.

(2) 10 parts of 3-methyl-4-chlorophenyl-1-thioglycol-2-carboxylic acid are slowly heated to boiling together with 40 parts of acetic anhydride and 2 parts of anhydrous sodium acetate. Boiling having been continued for a short time, the mixture of acetic anhydride and glacial acetic acid is distilled off, the 4-methyl-5-chloro-3-acetylhydroxythionaphthene is saponified and the product is oxidized in the usual manner so as to form the dyestuff. The dyestuff has the formula indicated in the preceding example.

The 3-methyl-4-chlorophenyl-1-thioglycol-2-carboxylic acid can be obtained by transforming the 6-chloro-2-amino-1-methyl-benzene-3-sulfonic acid by way of the diazo compound into the 3-chloro-2-cyano-1-methylbenzene-3-sulfonic acid and converting the latter by one of the usual methods into the 3-methyl-4-chlorophenyl-1-thioglycol-2-carboxylic acid, the cyano group being saponified.

(3) 6.4 parts of 4.4'-dimethylthioindigo are mixed, while stirring, with 40 parts of nitrobenzene, and 6 parts of sulfuryl chloride are added in the cold. The mass is first stirred for one hour in the cold, gradually heated to 70° C. and maintained at this temperature for 2 hours. It is then allowed to cool, filtered by suction and the nitrobenzene is eliminated from the filtrate by blowing off with steam or washing with alcohol. The dyestuff has the formula indicated in Example 1.

(4) 21 parts of dichlor isatin are heated in 250 parts of benzene together with 21 parts of phosphorus pentachloride until dissolution has taken place and there is then added a suspension of 24.4 parts of 5-bromo-4-methyl-3-hydroxythionaphthene. The whole is stirred at 20° C. to 30° C. for several hours. The dyestuff after being separated from the benzene dyes cotton a bluish violet tint. It is soluble in concentrated sulfuric acid to a blue solution. It has the following formula:

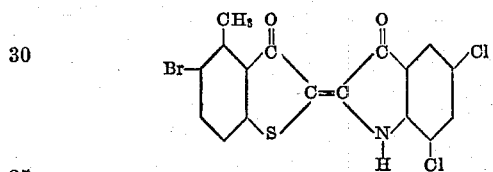

We claim:
1. The vat dyestuff of the following formula:

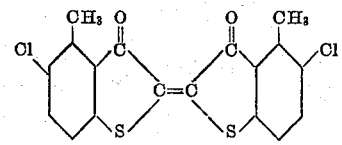

being a bluish-red powder, soluble in sulfuric acid to a green solution and dissolving to a golden-yellow vat from which cotton is dyed a bluish-red tint of excellent fastness properties.

2. The vat dyestuffs of the following formula:

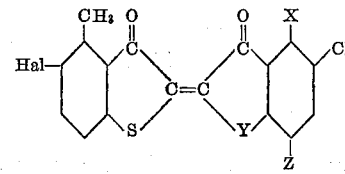

in which when Y=S, X is $CH_3$, Z is H and Hal is Cl and when Y=NH, X is H, Z is Cl and Hal is Br yielding on cotton from the vat dyeings of very good fastness properties.

3. The vat dyestuff of the following formula:

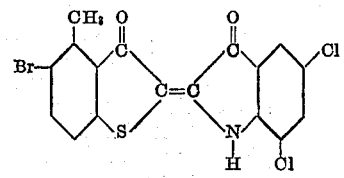

dyeing cotton a bluish violet tint.

ERWIN HOFFA.
HANS HEYNA.